US012598317B2

(12) United States Patent
Li et al.

(10) Patent No.: US 12,598,317 B2
(45) Date of Patent: Apr. 7, 2026

(54) HYBRID SPATIO-TEMPORAL NEURAL MODELS FOR VIDEO COMPRESSION

(71) Applicant: Adeia Guides Inc., San Jose, CA (US)

(72) Inventors: Zhu Li, Overland Park, KS (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 145 days.

(21) Appl. No.: 18/532,638

(22) Filed: Dec. 7, 2023

(65) Prior Publication Data

US 2025/0193423 A1     Jun. 12, 2025

(51) Int. Cl.
H04N 19/42        (2014.01)
H04N 19/172       (2014.01)
(52) U.S. Cl.
CPC ........... H04N 19/42 (2014.11); H04N 19/172 (2014.11)
(58) Field of Classification Search
CPC ...... H04N 19/00; H04N 19/59; H04N 19/142; H04N 19/172
See application file for complete search history.

(56) References Cited

U.S. PATENT DOCUMENTS

2024/0386651 A1*  11/2024  Liu ....................... G06T 17/005
2025/0191353 A1    6/2025  Li et al.

OTHER PUBLICATIONS

Yoon et al. "Cross-Guided Optimization of Radiance Fields with Multi-View Image Super-Resolution for High-Resolution Novel View Synthesis." 2023 IEEE/CVF Conference on Computer Vision and Pattern Recognition (CVPR) (Year: 2023).*
AppleInsider Blog—https://appleinsider.com/articles/23/03/27/apple-acquires-ai-powered-video-compression-startup-waveone—Accessed Sep. 20, 2023.
Google DeepMind Blog—https://www.deepmind.com/blog/muzeros-first-step-from-research-into-the-real-world—Accessed Sep. 20, 2023.
J. M. Boyce, Y. Ye, J. Chen and A. K. Ramasubramonian, "Overview of SHVC: Scalable Extensions of the High Efficiency Video Coding Standard," in IEEE Transactions on Circuits and Systems for Video Technology, vol. 26, No. 1, pp. 20-34, Jan. 2016.

(Continued)

*Primary Examiner* — Kyle M Lotfi
(74) *Attorney, Agent, or Firm* — HG LAW LLP

(57) ABSTRACT

Systems and methods are provided for decoding visual content using a hybrid framework based on convolutional and neural radiance networks. A decoder receives bitstreams of model parameters, a sequence level representation, and a cross-resolution representation for reconstructing a sequence of frames. The model parameters comprise neural radiance network parameters. The decoder decodes the bitstreams of the model parameters, the sequence level representation, and the cross-resolution representation. The decoder generates, via a channel transformer, a combined representation based on the sequence level representation and the cross-resolution representation. The decoder adapts a neural network model based on the neural radiance network parameters. The decoder reconstructs the sequence of frames by determining, via the adapted neural network model based on the combined representation, pixel attribute information for each frame of the reconstructed sequence of frames. The decoder generates, for display at a client device, the reconstructed sequence of frames.

20 Claims, 10 Drawing Sheets

(56) References Cited

OTHER PUBLICATIONS

Johannes Balle, David Minnen, Saurabh Singh, Sung Jin Hwang, and Nick Johnston, "Variational image compression with a scale hyperprior," International Conference on Learning Representations, ICLR 2018.

Olaf Ronneberger, Philipp Fischer, Thomas Brox, "U-Net: Convolutional Networks for Biomedical Image Segmentation," MICCAI (3) 2015: 234-241.

R. Hang, Q. Liu, and Z. Li, "Spectral Super-Resolution Network Guided by Intrinsic Properties of Hyperspectral Imagery," IEEE Trans on Image Processing (TIP), doi:10.1109/TIP.2021.3104177, 2021.

Wen Ji, Zhu Li, Yiqiang Chen, "Joint Source-Channel Coding and Optimization for Layered Video Broadcasting to Heterogeneous Devices," IEEE Trans. Multimedia. 14(2): 443-455 (2012).

* cited by examiner

600

601

VAE Encoding Model

Frame (64x64x3) — 604

Conv (3 x 3, n, 1)
Conv (3 x 3, n, 2) — 606
RSAB

Conv (3 x 3, n, 1)
Conv (3 x 3, n, 2)
RSAB

Conv (3 x 3, n, 1)
Conv (3 x 3, n, 2)
RSAB $X_0$ (8x8xC0) — 608

602

Cross-Resolution Network Model

GoP (512x512x3) — 610

Conv (5 x 5, n, 1)
Conv (3 x 3, n, 2) — 612
RSAB

Conv (5 x 5, n, 1)
Conv (3 x 3, n, 2)
RSAB

Conv (3 x 3, n, 1)
Conv (3 x 3, n, 2) — 614
RSAB

Conv (3 x 3, n, 1)
Conv (3 x 3, n, 2)
RSAB

Conv (3 x 3, n, 1)
Conv (3 x 3, n, 2)
RSAB $Y_t$ (16x16xC1) — 616

800

Cross-Resolution Transformer Model

900

Spatio-Temporal
Neural Representation
(STNR)

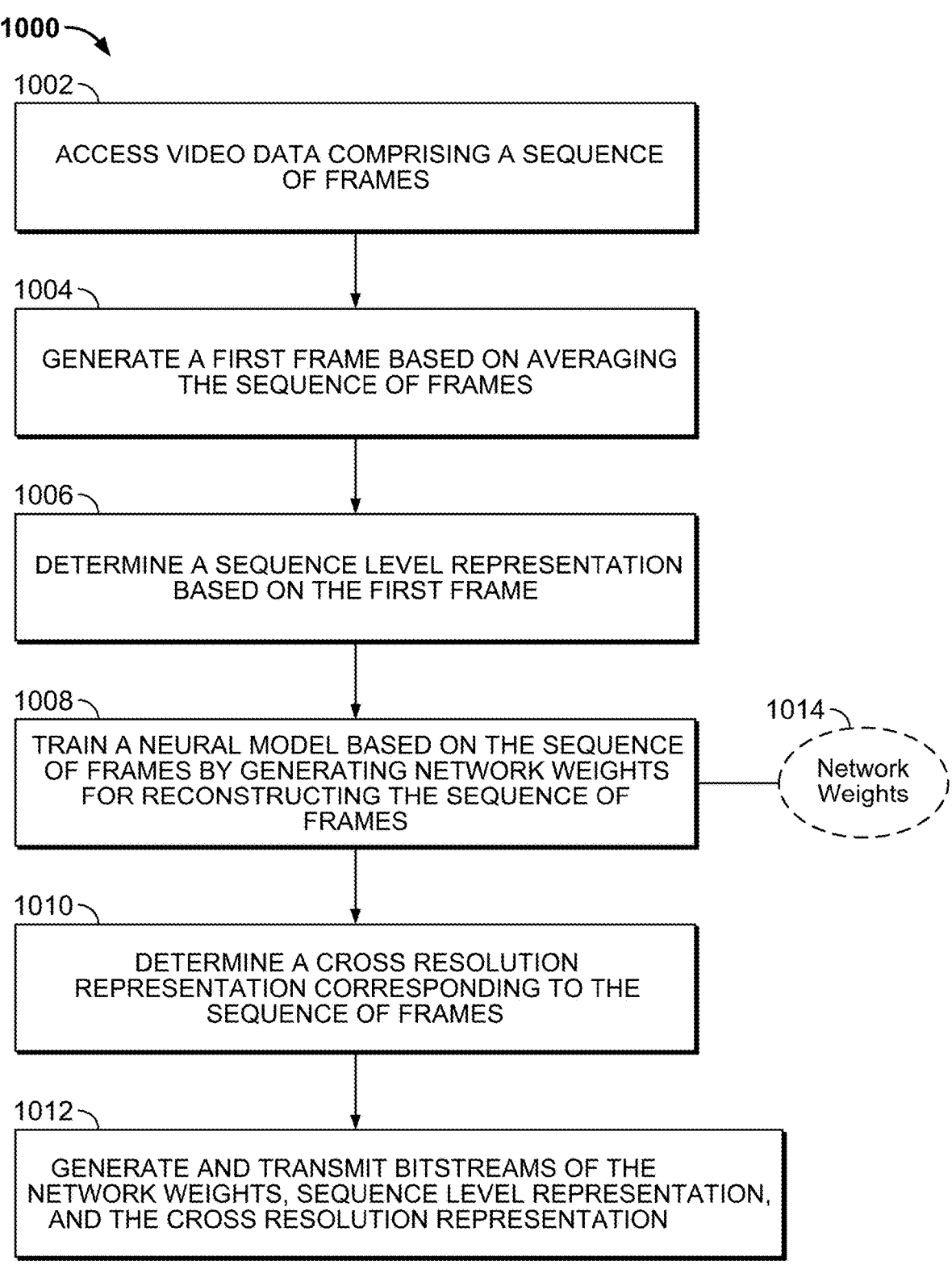

1000

1002

ACCESS VIDEO DATA COMPRISING A SEQUENCE OF FRAMES

1004

GENERATE A FIRST FRAME BASED ON AVERAGING THE SEQUENCE OF FRAMES

1006

DETERMINE A SEQUENCE LEVEL REPRESENTATION BASED ON THE FIRST FRAME

1008

TRAIN A NEURAL MODEL BASED ON THE SEQUENCE OF FRAMES BY GENERATING NETWORK WEIGHTS FOR RECONSTRUCTING THE SEQUENCE OF FRAMES

1014

Network Weights

1010

DETERMINE A CROSS RESOLUTION REPRESENTATION CORRESPONDING TO THE SEQUENCE OF FRAMES

1012

GENERATE AND TRANSMIT BITSTREAMS OF THE NETWORK WEIGHTS, SEQUENCE LEVEL REPRESENTATION, AND THE CROSS RESOLUTION REPRESENTATION

FIG. 10

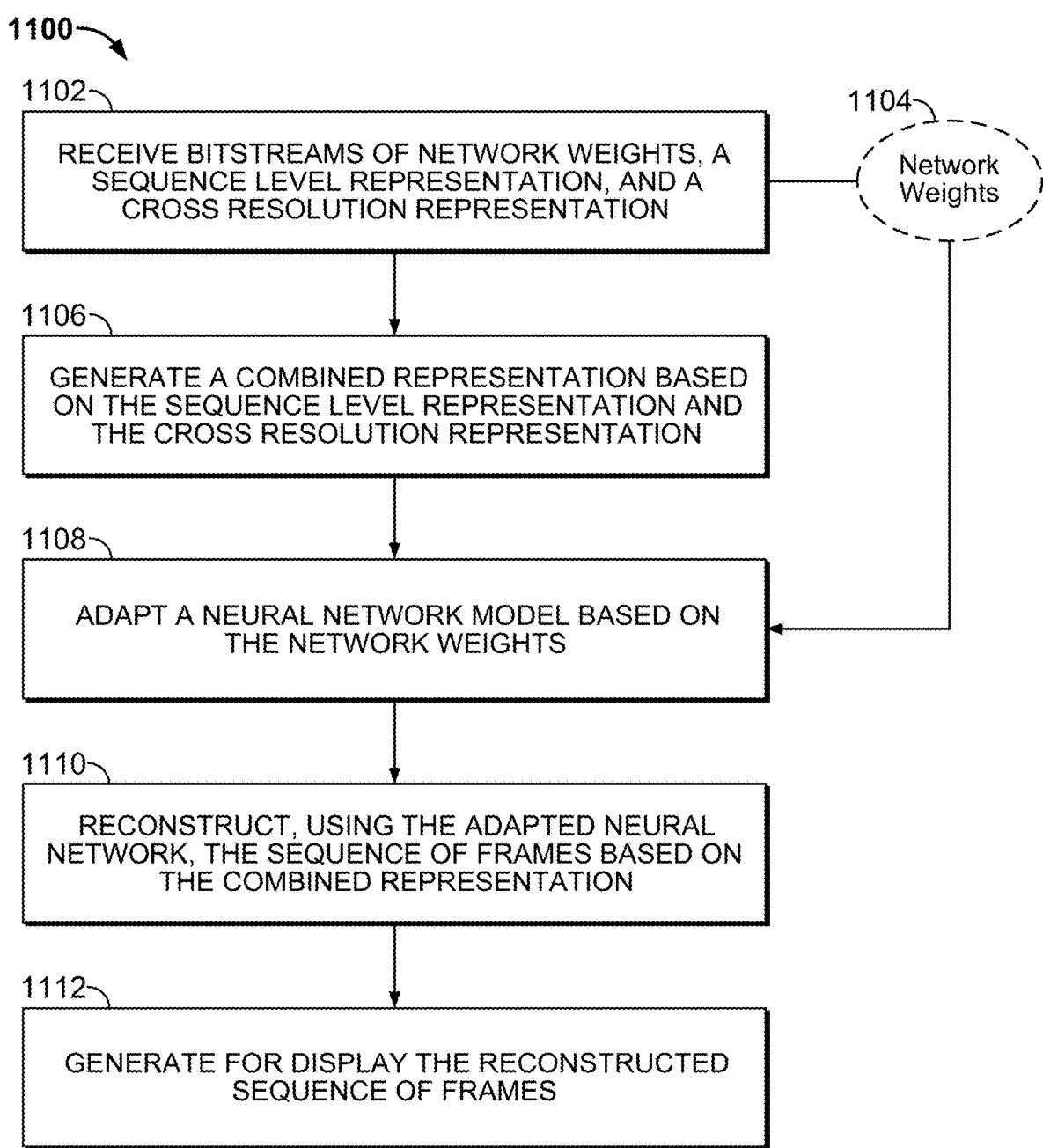

1100

1102
RECEIVE BITSTREAMS OF NETWORK WEIGHTS, A SEQUENCE LEVEL REPRESENTATION, AND A CROSS RESOLUTION REPRESENTATION

1104
Network Weights

1106
GENERATE A COMBINED REPRESENTATION BASED ON THE SEQUENCE LEVEL REPRESENTATION AND THE CROSS RESOLUTION REPRESENTATION

1108
ADAPT A NEURAL NETWORK MODEL BASED ON THE NETWORK WEIGHTS

1110
RECONSTRUCT, USING THE ADAPTED NEURAL NETWORK, THE SEQUENCE OF FRAMES BASED ON THE COMBINED REPRESENTATION

1112
GENERATE FOR DISPLAY THE RECONSTRUCTED SEQUENCE OF FRAMES

FIG. 11

HYBRID SPATIO-TEMPORAL NEURAL MODELS FOR VIDEO COMPRESSION

BACKGROUND

The present disclosure is directed to systems and methods for encoding visual content (e.g., video content, extended reality (XR) content). In particular, one or more of the systems and methods described herein provide for a compression framework that combines cross-resolution learning with a spatio-temporal neural model based on convolutional and neural radiance networks.

SUMMARY

Advances in deep learning neural network models (e.g., variational autoencoder (VAE), neural radiance field representation) enable nonlinear, dynamic transform coding for video sequence modeling and compression (e.g., lossless video compression). In some approaches, geometry information (e.g., pixels, voxels) may be mapped to a quantized latent representation using block-based or linear transforms. Such approaches may have lower compression efficiency than using nonlinear, dynamic coding via machine learning models (e.g., fully connected neural networks) defined by the model parameters (e.g., neural radiance network weights). For example, machine learning models may optimize overall compression of a group of pictures (GoP). This holistic approach may advance compression efficiency while balancing encoding complexity (e.g., for streaming or other visual media applications). In some approaches, neural network models can be trained for reconstructing visual content based on various training data sets (e.g., images, videos) by learning one or more mappings, for example, between pixels (or voxels) of an image and pixel (or voxel) attribute information. These approaches may be limited, for example, to reproducing a high-resolution image based on a training set of similar resolution and may lack the temporal information for reconstructing a video sequence. Efficient visual content compression that retains high visual fidelity is a key technology, for example, in XR applications and other visual media.

To help address the aforementioned limitations and other unsatisfactory aspects, systems and methods are described herein for a hybrid framework that combines cross-resolution representation learning (e.g., via a transformer attention network) with a sequence level spatio-temporal neural representation network, improving compression efficiency compared to some other approaches. Such a framework may be partially or wholly implemented in a content encoder/ decoder system. It is contemplated that one or more of the described techniques may be applicable to intra-coding and/or inter-coding schemes.

In some embodiments, the encoder accesses visual content data (e.g., a GoP) comprising a sequence of frames. The encoder generates a first frame based on the sequence of frames. In some aspects, the encoder generates an anchor frame representing a video sequence. Such a frame may be alternatively referred to as an index frame. The encoder may generate a downscaled first frame based on the first frame. The encoder determines a sequence level representation based on the first frame. The encoder trains a neural network model based on the sequence of frames to determine a cross-resolution representation corresponding to the sequence of frames. In some embodiments, training the neural network model comprises generating a plurality of model (e.g., coding) parameters for reconstructing the sequence of frames based on the sequence level representation and the cross-resolution representation. The model parameters include neural radiance network weights, for example, for adapting a multilayer perceptron (MLP)-type network. The encoder may generate bitstreams of the plurality of model parameters (e.g., neural radiance network weights), the sequence level representation, and the cross-resolution representation and transmit the bitstreams, for example, to a decoding device.

In some embodiments, accessing visual content data may comprise accessing video data via a content server and retrieving a video sequence from the video data. The video sequence may comprise a number of video frames and a time index for playing the video sequence.

In some embodiments, the hybrid framework comprises a decoder. It is noted that the encoder and the decoder are referred to separately for illustrative purposes, and this is intended to be nonlimiting. For example, the encoder may comprise a decoder subsystem. For example, the encoder and the decoder may be part of a video processing system implemented at one device. For example, the encoder may be at a remote server, and the decoder may be at a client device communicatively coupled to the remote server.

In some embodiments, the decoder receives the model parameters (e.g., a mapping corresponding to an autoencoder model, neural radiance network weights for an MLP network), a sequence level representation, and a cross-resolution representation for reconstructing a sequence of frames (e.g., from video data). The decoder generates a combined representation based on the sequence level representation and the cross-resolution representation, for example, via a channel transformer model. The decoder adapts a neural network model (e.g., a combined autoencoder and MLP network model) based on the plurality of model parameters. The decoder, via the adapted neural network model, generates a reconstructed sequence of frames based on the combined representation. The decoder may generate for display the reconstructed sequence of frames.

In some embodiments, generating the combined representation comprises generating combined feature information of the sequence level representation and the cross-resolution representation. In some embodiments, adapting the neural network model based on the plurality of coding parameters comprises adapting a spatio-temporal neural representation (STNR) model based on the coding parameters (e.g., from the autoencoder model). The STNR model may comprise a convolutional network part and a nonlinear-activated feedforward network part.

The convolutional network part may comprise an auto-encoder model that is adapted using the model parameters. The decoder may use the autoencoder model (e.g., the decoding function of the autoencoder) to determine feature information corresponding to the sequence of frames based on the combined representation for reconstructing the sequence of frames. In some embodiments, the nonlinear-activated feedforward network part comprises an MLP network configured for neural radiance reconstruction. The MLP network may comprise neural nodes having a nonlinear-type activation function. The decoder may use the MLP network to generate the reconstructed sequence of frames using the feature information from the autoencoder model. As a non-limiting example, the decoder may determine, via the adapted STNR model, pixel attribute information (e.g., color values for each pixel or pixel regions) across the reconstructed sequence of frames. In this example, the adapted STNR model may be trained to output the pixel attribute information based on input pixel coordinates. The pixel coordinates may comprise a timeline (or a frame index) corresponding to the sequence of frames.

Some advantages of the described systems and methods include efficiently training the deep learning network models at an encoder to generate feature information that may be combined via a channel transformer model for reconstructing the video sequence. As an illustrative example, the downscaled index frame may be analogous to low-frequency components of a video signal determined from block-based signal decomposition techniques (e.g., discrete cosine transform, orthogonal transform). The cross-resolution representation may be analogous to mid-to-high frequency components of the video signal determined from block-based signal decomposition techniques. In some aspects, combining the feature information via the channel transformer model may be analogous to combining the frequency components of the video signal. The decoder leverages the combined feature information and determines, via an STNR model, the temporal correlation of the video frames to reconstruct the video sequence.

As a result of the systems and methods described in the present disclosure, visual content (e.g., 4D content) may be efficiently compressed to alleviate system resource demands, for example, in storage, transmission, rendering, and/or reconstruction operations. In some advantageous aspects, one or more of the systems and methods for the hybrid framework described herein enable efficient visual content coding and video compression. The efficient compression enabled by the hybrid framework provides overall lower data rates and high compression ratios, resulting in improved system resource utilization and alleviating bandwidth demand, processing time, and occupied memory for the involved systems and devices compared to other approaches, leading to improvements upon the other approaches towards visual media including XR and other immersive media applications.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings may not be made to scale.

FIG. 10 is a flowchart of a detailed illustrative process for coding visual content, in accordance with some embodiments of this disclosure; and FIG. 11 is a flowchart of a detailed illustrative process for reconstructing visual content, in accordance with some embodiments of this disclosure.

DETAILED DESCRIPTION

Figure 1:
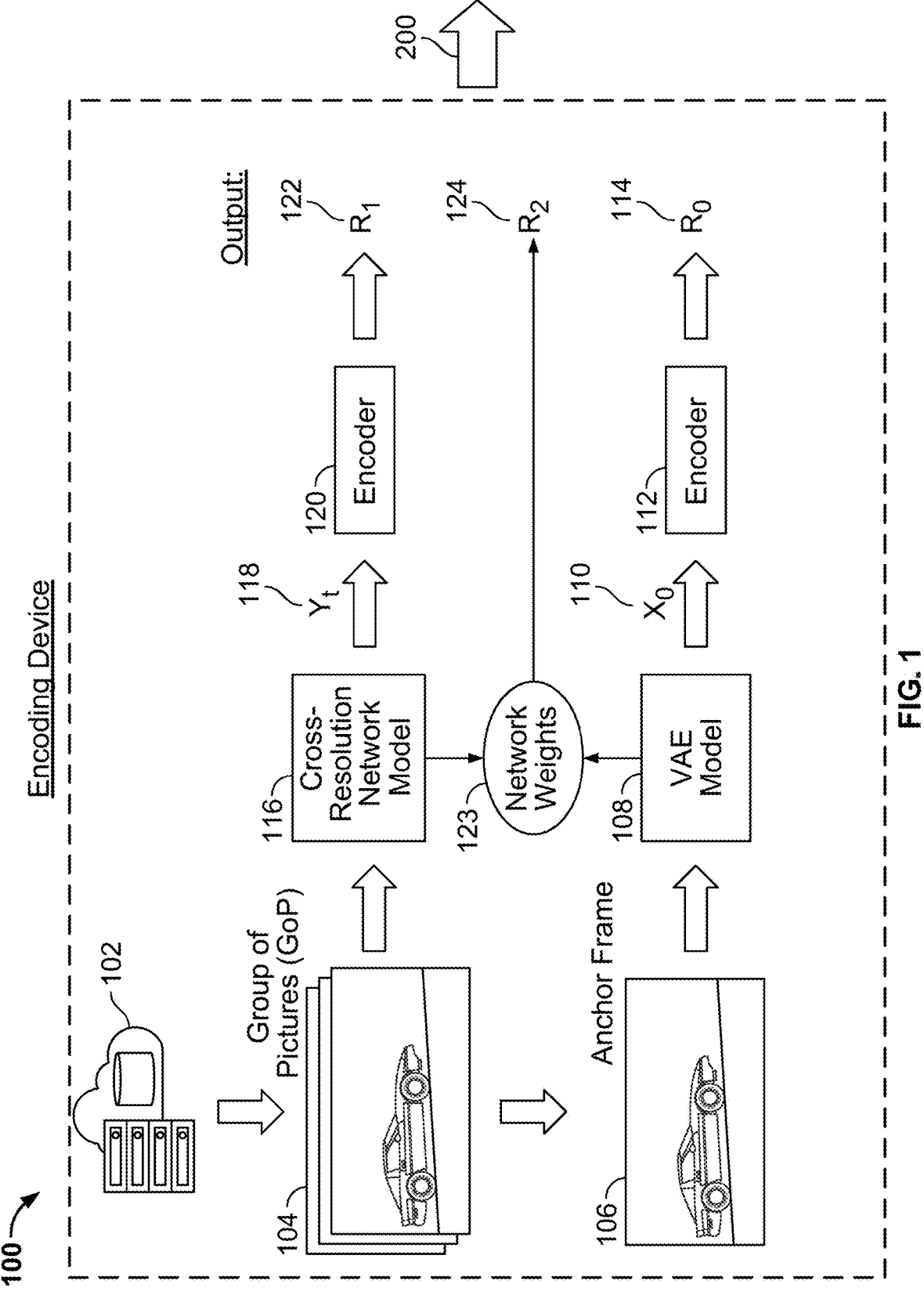
FIG. 1 shows an illustrative example of a coding framework, in accordance with some embodiments of this disclosure.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, 3D modeling data (e.g., captured via 3D scanning, etc.), and/or any other media or multimedia and/or any combination thereof. Extended reality (XR) content refers to augmented reality (AR) content, virtual reality (VR) content, mixed reality (MR) content, hybrid content, and/or other digital content combined with or mirroring the physical world objects, including interactions with such content.

As referred to herein, compression and/or encoding of media content may be understood as any suitable combination of hardware and/or software configured to perform bit reduction techniques on digital bits of the media content in order to reduce the amount of data required to transmit and/or store the media content. Such techniques may reduce the bandwidth or network resources required to transmit the media content over a network or other suitable wireless or wired communication medium and/or enable bitrate savings with respect to downloading or uploading the media content. Such techniques may encode the media content such that the encoded media content may be represented with fewer digital bits than the original representation while reducing the impact of the encoding or compression on the visual quality of the media content. In some embodiments, parts of encoding the media content may include employing a hybrid video coder such as, for example, the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

Although reference may be made to an encoder and/or a decoder herein for illustrative purposes, it is appreciated that the hybrid framework as described is not intended to be limited to such systems and may include various components such as the following.

As described, the hybrid framework may include hardware, software, firmware, and/or any combinations of components thereof, where any of the involved systems may perform one or more of actions of the described techniques without departing from the teachings of the present disclosure. Some non-limiting examples are described as follows. For example, a content encoder may include a locally hosted application at user equipment (e.g., user device). For example, a content encoder may include a remote application hosted at a server communicatively coupled to one or more content delivery systems, where the content encoder provides instructions that are transmitted to the systems and executed by the relevant subsystems (e.g., at edge servers of a content delivery network (CDN)) along the transmission path to the transmitted content's destination. For example, a content encoder may include a subsystem integrated with the local client systems. For example, a content encoder may include a local application at the client-side systems and a remote system communicatively coupled thereto.

It is noted that reference to a model may include a machine learning model, a deep learning model, a neural network, a convolutional neural network (CNN), a multi-layer perceptron (MLP) artificial neural network, a recurrent neural network, a generative neural network, or any other suitable type of machine learning model and variants thereof, or any other computer-implemented technique may be employed, or any combination thereof.

One or more of the described systems and methods may be applicable to a group of pictures in various contexts, for example, in the temporal domain, across multiple viewpoints or perspectives, and combinations thereof. For example, a client device may be an XR headset, and the sequence of frames collectively define a field of view (FoV) at the XR headset. The sequence of frames may correspond to one or more display refresh cycles at the XR headset.

It is noted that individual frames, or parts thereof, in a group of pictures (e.g., a video sequence, multiple viewpoints, changing field of view, etc.) may be referred to by spatio-temporal coordinates. For example in a video sequence, (2,4,3) may refer to the pixel (2,4) of the $3^{rd}$ frame. It is appreciated that other coordinate systems may be used (e.g., relative to a starting frame in a video sequence) without departing from the teachings of the present disclosure. In some advantageous aspects, one or more of the described techniques allow a machine learning model to learn a fully connected neural representation of the spatio-temporal signals (e.g., video).

FIG. 1 shows an illustrative example of a coding framework 100, in accordance with some embodiments of this disclosure. In some embodiments, the framework 100 may be implemented at an encoding device (or encoder). It is appreciated that the framework 100 is not intended to be limited to such a system.

The framework 100 comprises a content source 102 (e.g., a CDN server). An encoder accesses video data from the content source 102 comprising a GoP 104 (e.g., a video sequence). The encoder generates an anchor frame 106 based on the GoP 104. The encoder uses an autoencoder model 108 (e.g., a variational autoencoder neural network or another variant) to determine a sequence level latent representation 110 (labeled $X_0$) from the anchor frame 106. The encoder uses a cross-resolution network model 116 to determine a cross-resolution representation 118 (labeled $Y_t$) from the GoP 104. In some embodiments, the cross-resolution network model 116 may comprise an autoencoder model having a different configuration than the autoencoder model 108. In some embodiments, the encoder concurrently determines the sequence level latent representation 110 and the cross-resolution representation 118, for example, by executing the models 108, 116 in parallel. The autoencoder model 108 and the cross-resolution network model 116 are trained based on their respective inputs to determine the trained model parameters, which may be stored as network weights 123. In some aspects, the autoencoder model 108 and the cross-resolution network model 116 learn a mapping between their respective input data and output data (e.g., between anchor frame 106 and the sequence level representation 110 or between the GoP 104 and the cross-resolution representation 118), where the mapping is represented by the network weights 123. The network weights 123 may be coded and passed as a bitstream 124 (labeled $R_2$). The representations 110, 118 may be respectively coded via encoding modules 112, 120 (e.g., using coding techniques such as quantization, arithmetic coding, etc.) to generate bitstreams 114, 122 (labeled $R_0$, $R_1$). The encoder may transmit bitstreams $R_0$, $R_1$, $R_2$ to a decoder (e.g., decoding framework 200). In some embodiments, the encoder stores encodings of the network weights 123, the sequence level representation 110, and the cross-resolution representation 118. Bitstreams based on the stored encodings may be transmitted in response to a request for corresponding content (e.g., a video comprising the GoP 104).

As an illustrative example, the encoder may retrieve a 30-frame video clip as GoP 104 showing a vehicle racing down a track. For example, the 30-frame video clip may correspond to one second for a display having a 30 Hz refresh rate. The encoder generates an average thumbnail of the video clip as anchor frame 106 by downscaling and averaging the 30 frames. The average thumbnail is inputted to a first convolutional network to learn a sequence level latent representation $X_0$, for example, as part of the autoencoder model 108. The autoencoder model 108 may comprise a VAE framework that encodes $X_0$ to generate a bitstream $R_0$. The 30 frames are inputted to a second convolutional network to learn a cross-resolution representation as latent features $Y_t$, which may represent a cross-resolution residual. The first and second convolutional networks include one or more residual spatial attention blocks (RSAB) for dimensionality reduction. In some aspects, an RSAB computes a spatial attention map, emphasizing features of the input data for a machine learning model. For example, the first convolutional network may comprise three convolutional layers (Conv) with RSABs for producing expanded feature channels from input feature channels. If the anchor frame 106 has dimensions of 64×64×3, $X_0$ may have dimensions of 8×8×C0, where C0 indicates the number of expanded feature channels. As a second example, the second convolutional network may comprise five Conv with RSABs for producing expanded feature channels from input feature channels. If the GoP 104 has dimensions of 512× 512×3, $Y_t$ may have dimensions of 16×16×C1, where C1 indicates the number of expanded feature channels. In this manner, the autoencoder model 108 may learn a compact representation through the first convolutional network. The GoP 104 is coded through the second convolutional network, where the feature map is represented by latent features $Y_t$. The cross-resolution representation may comprise the latent features $Y_t$ corresponding to the frames of the GoP 104. The latent features $Y_t$ may be coded as bitstream $R_1$, for example, based on quantization of the latent features $Y_t$. The parameters from the first and second convolutional networks (e.g., from the decoding function of an autoencoder model) may be stored and coded as $R_2$.

In some embodiments, the encoder may generate the first frame by averaging one or more graphic attributes of each pixel or a plurality of pixels across the GoP 104. This may be referred to as temporal averaging of the video sequence. For example, the encoder averages pixel color values (e.g., RGB values) of the sequence of frames to generate the first frame, wherein each pixel or pixel region corresponds to an averaged color value across the sequence. The anchor frame 106 may comprise a thumbnail or other image representation. In some aspects, the anchor frame 106 represents graphic attribute information corresponding to all frames, or at least a substantial portion, of the GoP 104. For example, the anchor frame 106 may comprise a range of pixel attribute values of a video sequence. For example, the anchor frame 106 may comprise average pixel attribute values for the GoP 104. As a non-limiting example, the encoder may average the color value of a pixel across all frames of the GoP 104 and assign the color value to the corresponding pixel of the anchor frame 106. The anchor frame 106 may be a downscaled version of the GoP 104. For example, the GoP 104 may have dimensions of 512×512×3 pixels. The anchor frame 106, through downscaling, may have dimensions of 64×64×3 pixels. In this manner, the anchor frame 106 may retain graphic attribute information corresponding to the GoP 104.

In some embodiments, determining a sequence level representation based on the first frame comprises training a neural network model. For example, the autoencoder model 108, such as a variational autoencoder network, may be trained to learn coding parameters based on the anchor frame 106 and generate the sequence level representation 110. An autoencoder model learns parameters for encoding input data and reconstructing the input data from an encoded representation. The encoder may determine and/or store the autoencoder parameters corresponding to the sequence level representation by training the autoencoder model based on an input frame. An autoencoder or an analogous convolutional network model may be adapted for reconstruction using the mapping represented by network weights 123 (e.g., using the decoding function of an autoencoder). For example, reconstructing the GoP 104 may comprise combining, using a channel transformer model, the sequence level representation 110 and the cross-resolution representation 118 (e.g., the latent features $Y_r$).

In some embodiments, determining a cross-resolution representation corresponding to a sequence of frames comprises inputting the frames to an autoencoder model to determine the coding parameters corresponding to latent features of the sequence. For example, the cross-resolution network model 116 may map the GoP 104 to the latent features $Y_r$. In some embodiments, the cross-resolution representation comprises a cross-resolution residual for reconstructing the video sequence via a channel transformer model (e.g., at a decoder). The autoencoder model may be trained based on the anchor frame 106 and the GoP 104 to generate coding parameters for reconstructing the GoP 104. In some embodiments, a first autoencoder model is trained based on the first frame, and a second autoencoder model is trained based on the sequence of frames. Each autoencoder model generates respective sets of coding parameters for reconstructing the video sequence, which may be encoded together in one bitstream.

In some embodiments, the sequence level representation comprises first pixel attribute information corresponding to a first frame, and the cross-resolution representation comprises second pixel attribute information corresponding to a sequence of frames. A neural radiance network model (e.g., an MLP network) may be trained to determine pixel attribute information for reconstructing the sequence of frames from the first and second pixel attribute information. In some aspects, a neural radiance network model learns a mapping for reconstructing a representation of a scene from images at different viewpoints. The parameters of the trained neural radiance network model are included in the network weights 123.

Figure 2:
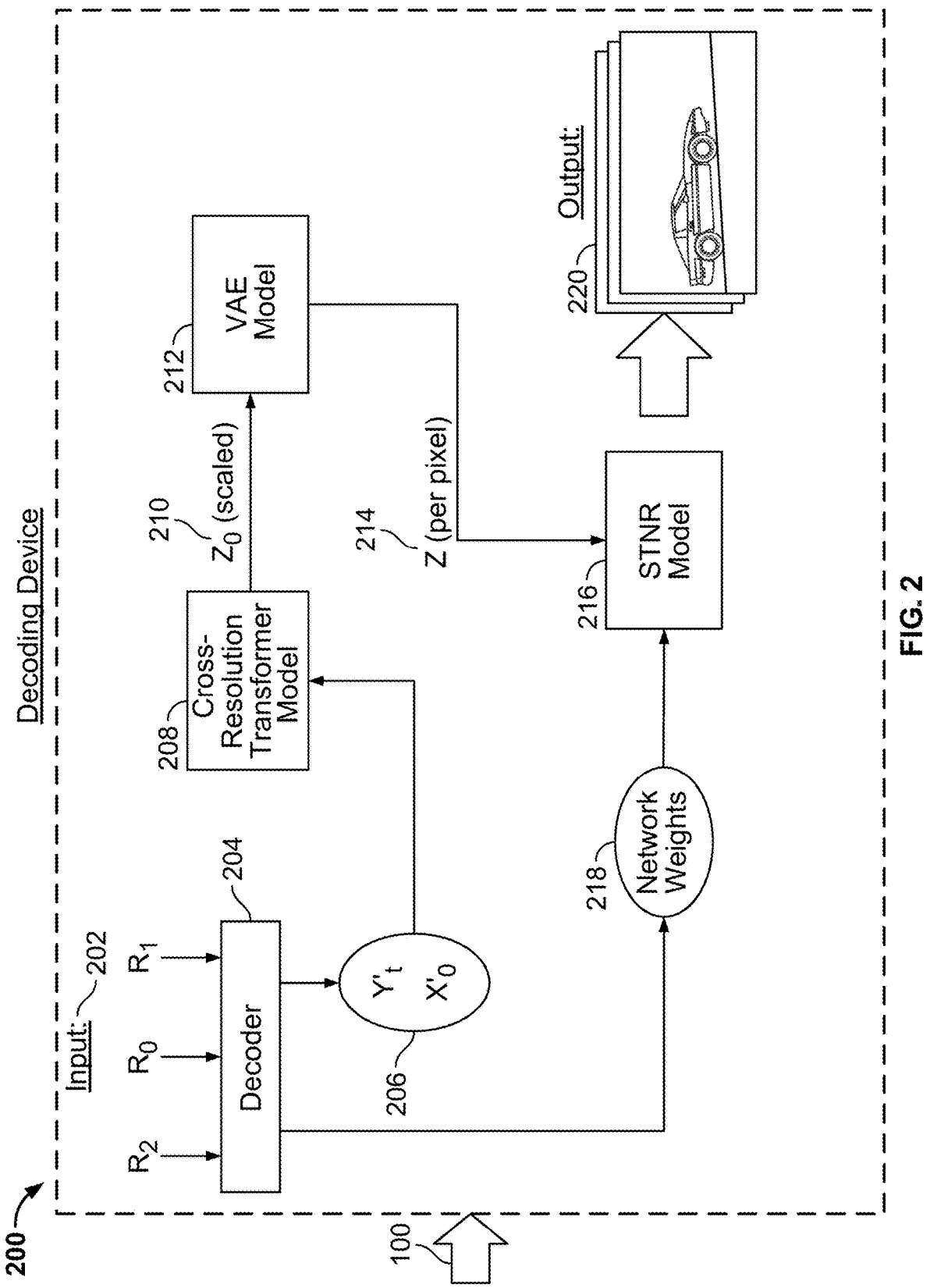
FIG. 2 shows an illustrative example of a decoding framework, in accordance with some embodiments of this disclosure.

FIG. 2 shows an illustrative example of a decoding framework 200, in accordance with some embodiments of this disclosure. In some embodiments, the framework 200 may be implemented at a decoding device (or decoder). It is appreciated that the framework 200 is not intended to be limited to such a system.

The framework 200 comprises a decoding module 204, a cross-resolution transformer model 208 (e.g., a channel transformer), an autoencoder model 212, and an STNR model 216. A decoder may receive input data 202 comprising bitstreams $R_0$, $R_1$, $R_2$, for example, from an encoder as described with respect to the framework 100. The decoder, via the decoding module 204, decodes the bitstreams to get representations 206 (e.g., a sequence level representation $X'_0$ and a cross-resolution representation $Y'_r$) and neural network weights 218. The sequence level representation $X'_0$ corresponds to the sequence level representation 110 ($X_0$). The cross-resolution representation $Y'_r$ corresponds to the cross-resolution representation 118 ($Y_r$). The neural network weights 218 may include neural radiance network parameters. An STNR model 216 may be adapted using the weights 218. For example, the neural radiance network parameters may be inputted to an MLP network in preparation for reconstructing a video sequence.

The sequence level representation $X'_0$ may be upscaled using a convolution network to have the same dimensions as the cross-resolution representation $Y'_r$. The representations 206 are combined via the cross-resolution transformer model 208 to generate a combined representation 210 (labeled $Z_0$) having the same dimensions as the cross-resolution representation $Y'_r$. In some embodiments, combining the sequence level representation and the cross-resolution representation comprises combining feature channels via a channel transformer. In some aspects, the channel transformer fuses the cross-scale feature information of the sequence level representation and the cross-resolution representation. For example, the cross-resolution transformer model 208 may fuse feature channels of the anchor frame (e.g., $X'_0$) and the cross-resolution residual (e.g., $Y'_r$) to generate the combined representation 210. The decoder, via an autoencoder model 212, brings the combined representation 210 to the same dimensions as the GoP 104 and determines latent features 214 (labeled Z). In some aspects, the latent features 214 correlate the features per pixel in a sequence of frames. The decoder, via the STNR model, determines the features for each pixel (or a plurality of pixels) of the GoP 104 through the latent features 214 and generates the reconstructed GoP 220 for display. For example, the GoP 220 may be displayed at a client device.

As an illustrative example, the decoder may receive and decode bitstreams 114, 122, and 124 to get features $X'_0$, $Y'_r$, and the coding parameters. Continuing the example described with respect to FIG. 1, $X'_0$ may have dimensions of 8×8×C0, and $Y'_r$ may have dimensions of 16×16×C1. The cross-resolution transformer model 208 may upscale $X'_0$ to have the same dimensions as $Y'_r$. For example, $X'_0$ may be processed using one or more transposed convolution layers (TConv) that produce contracted feature channels from input feature channels. The cross-resolution transformer model 208 combines the features of the upscaled $X'_0$ and $Y'_r$ to generate combined features $Z_0$ with dimensions of 16×16× C1. The combined features $Z_0$ are upscaled to generate latent features Z having the dimensions of the GoP 104 via the autoencoder model 212 (e.g., the decoding function) using one or more TConv with RSABs. In some embodiments, the autoencoder model 212 may use the same parameters as the cross-resolution network model 116 (e.g., obtained from the neural network weights 218). For example, the autoencoder model 212 may comprise five TConv with RSABs. If $Z_0$ has dimensions of 16×16×C1, the latent features Z may have dimensions of 512×512×3. In some aspects, the latent features Z include temporal information of the pixels of the GoP 104. The STNR model 216 may leverage the temporal information to determine the pixel values per frame of a sequence. For example, the STNR model 216 may comprise an MLP network. The MLP network may be configured for neural radiance reconstruction from the neural radiance network parameters of the network weights 218. For example, the MLP network weights may be tuned based on the neural radiance network parameters such that the MLP network represents the temporal correlation of a sequence as a neural radiance field. For example, for spatial coordinates (x,y) of a pixel at a time (or frame index) t, the MLP network may determine the pixel attributes (e.g., the color value). The decoder, via the STNR model 216, determines the pixel attributes (e.g., color values) for each pixel, or a plurality of pixels, for dimensions matching the GoP 104. For example, the decoder reconstructs the pixels belonging to GoP 104 as GoP 220. In this example, the GoP 220 may be displayed as a 30-frame video clip showing a vehicle racing down a track.

In some embodiments, adapting a neural network model for reconstructing a sequence of frames may comprise pre-training a first neural network. For example, the STNR model may comprise a first neural network having unbiased weights. The first neural network may comprise a plurality of Conv with RBSAs (e.g., configured for upscaling). The first neural network may be pre-trained in a first pass. For example, the first neural network may be used to recover pixel information from $X'_0$ and $Y'_t$ with some residual. In this example, the first neural network may be pre-trained once the peak signal-to-noise ratio (PSNR) is within a range of about 20 to about 30 dB. Pre-training the first neural network comprises modifying the unbiased weights and generating first network weights. An MLP network may be added to the first neural network for reconstructing the GoP 104. In some embodiments, the MLP network replaces one or more convolutional layers. For example, the first neural network may comprise a sequence with five layers. The last layer in the sequence may be replaced with an MLP network configured for neural radiance reconstruction.

Figure 3:
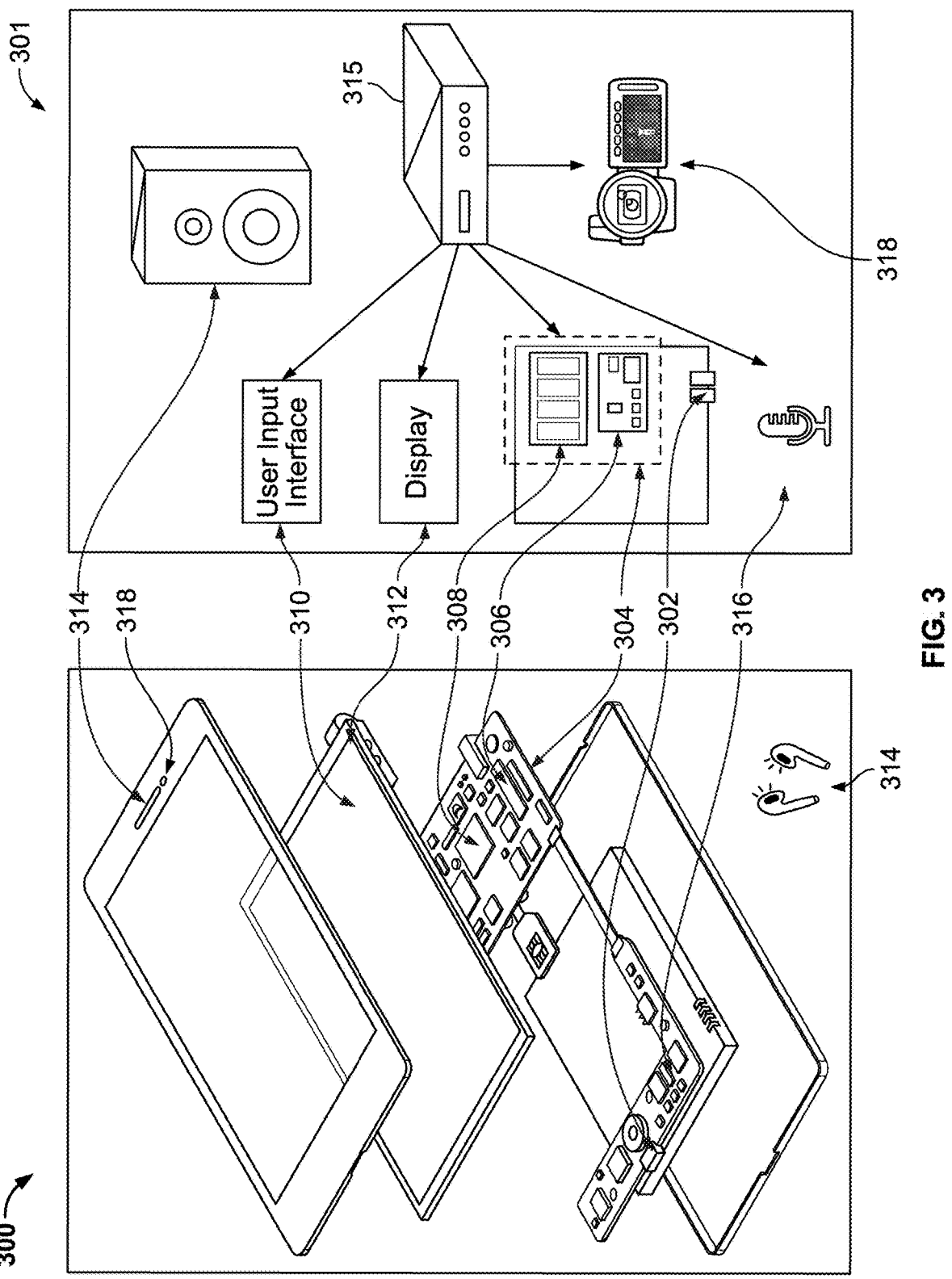
FIG. 3 shows illustrative user equipment, in accordance with some embodiments of this disclosure.
Figure 4:
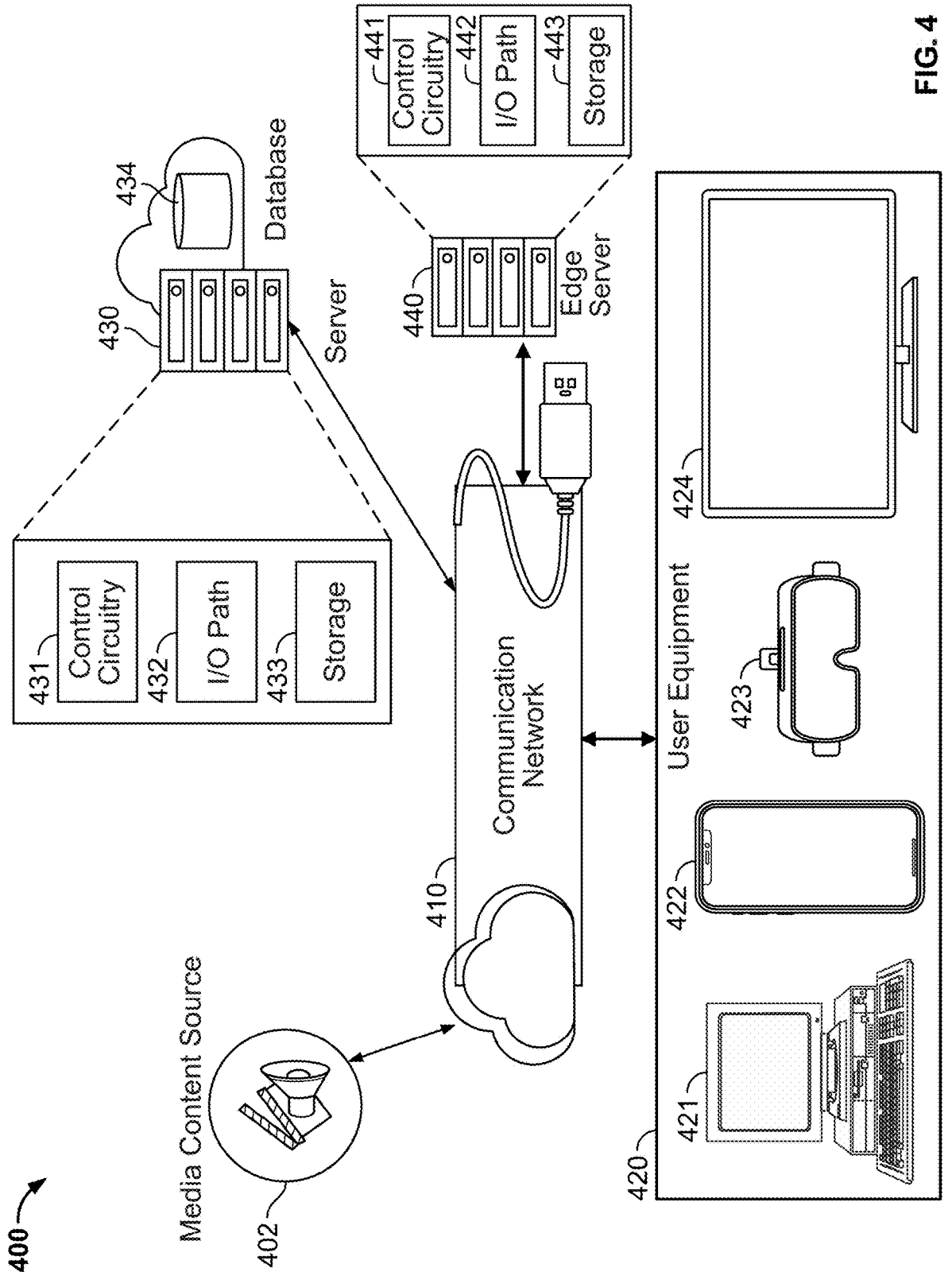
FIG. 4 shows an example system for providing content including visual content, in accordance with some embodiments of this disclosure.

FIGS. 3-4 depict illustrative devices, systems, servers, and related hardware for visual content coding/decoding. It is contemplated that the encoder/decoder as described herein may be implemented as an encoding application in one or more embodiments. FIG. 3 shows generalized embodiments of illustrative user equipment devices 300 and 301, in accordance with some embodiments of this disclosure. For example, user equipment device 300 may be a smartphone device, a tablet, a virtual reality or augmented reality device, or any other suitable device capable of processing video data. In another example, user equipment device 301 may be a user television equipment system or device. In this example, user equipment device 301 may include set-top box (STB) 315. STB 315 may be communicatively connected to microphone 316, audio output equipment 314 (e.g., speakers, headphones, etc.), and display 312. In some embodiments, display 312 may be a television display or a computer display. In some embodiments, STB 315 may be communicatively connected to user input interface 310. In some embodiments, user input interface 310 may be a remote-control device. STB 315 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 300 and user equipment device 301 may receive content and data via input/output (I/O) path (e.g., I/O circuitry) 302. I/O path 302 may provide content (e.g., broadcast programming, on-demand programming, Internet content, content available over a local area network (LAN) or wide area network (WAN), and/or other content) and data to control circuitry 304, which may comprise processing circuitry 306 and storage 308. Control circuitry 304 may be used to send and receive commands, requests, and other suitable data using I/O path 302, which may comprise I/O circuitry. I/O path 302 may connect control circuitry 304 (and/or processing circuitry 306) to one or more communications paths (described below). I/O functions may be provided by one or more of these communications paths, but are shown as a single path in FIG. 3 to avoid overcomplicating the drawing. While STB 315 is shown in FIG. 3 for illustration, any suitable computing device having processing circuitry, control circuitry, and storage may be used in accordance with the present disclosure. For example, STB 315 may be replaced by, or complemented by, a personal computer (e.g., a notebook, a laptop, a desktop), a smartphone (e.g., device 300), a tablet, a network-based server hosting a user-accessible client device, a non-user-owned device, any other suitable device, or any combination thereof.

Control circuitry 304 may be based on any suitable control circuitry such as processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an encoding application stored in memory (e.g., storage 308). Control circuitry 304 may be instructed by the encoding application to perform the functions discussed above and below. In some implementations, processing or actions performed by control circuitry 304 may be based on instructions received from the encoding application.

In client/server-based embodiments, control circuitry 304 may include communications circuitry suitable for communicating with a server or other networks or servers. The encoding application may be a stand-alone application implemented on a device or a server. The encoding application may be implemented as software or a set of executable instructions. The instructions for performing any of the embodiments discussed herein of the encoding application may be encoded on non-transitory, computer-readable media (e.g., a hard drive, random-access memory on a DRAM integrated circuit, read-only memory on a BLU-RAY disk, etc.). For example, in FIG. 3, the instructions may be stored in storage 308, and executed by control circuitry 304 of a device 300.

Control circuitry 304 may include communications circuitry suitable for communicating with a server, edge computing systems and devices, a table or database server, or other networks or servers. The instructions for carrying out the aforementioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as encoding application data described above. Nonvolatile memory may also be used (e.g., to launch a boot-up routine and other instructions). Cloud-based storage, described in relation to FIG. 3, may be used to supplement storage 308 or in place of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into an output format of user equipment device 300. Control circuitry 304 may also include digital-to-analog converter circuitry and analog-to-digital converter circuitry for converting between digital and analog signals. The tuning and encoding circuitry may be used by user equipment device 300, 301 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment device 300, the tuning and encoding circuitry (including multiple tuners) may be associated with storage 308.

Control circuitry 304 may receive instruction from a user by way of user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of user equipment device 300 and user equipment device 301. For example, display 312 may be a touchscreen or touch-sensitive display. In such circumstances, user input interface 310 may be integrated with or combined with display 312. In some embodiments, user input interface 310 includes a remote-control device having one or more microphones, buttons, keypads, and any other components configured to receive user input or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to STB 315.

Audio output equipment 314 may be integrated with or combined with display 312. Display 312 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 312. Audio output equipment 314 may be provided as integrated with other elements of each one of devices 300 and 301 or may be stand-alone units. An audio component of videos and other content displayed on display 312 may be played through speakers (or headphones) of audio output equipment 314. In some embodiments, audio may be distributed to a receiver, which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304. Camera 318 may be any suitable video camera integrated with the equipment or externally connected. Camera 318 may be a digital camera comprising a charge-coupled device (CCD) and/or a complementary metal-oxide semiconductor (CMOS) image sensor. Camera 318 may be an analog camera that converts to digital images via a video card.

The encoding application may be implemented using any suitable architecture. For example, it may be a stand-alone application wholly-implemented on each one of user equipment device 300 and user equipment device 301. In such an approach, instructions of the application may be stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to provide encoding/decoding functionality and perform any of the actions discussed herein. Based on the processed instructions, control circuitry 304 may determine what action to perform when input is received from user input interface 310. For example, movement of a cursor on a display up/down may be indicated by the processed instructions when user input interface 310 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the encoding application is a client/server-based application. Data for use by a thick or thin client implemented on each one of user equipment device 300 and user equipment device 301 may be retrieved on-demand by issuing requests to a server remote to each one of user equipment device 300 and user equipment device 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on device 300. This way, the processing of the instructions is performed remotely by the server while the resulting displays (e.g., that may include text, a keyboard, or other visuals) are provided locally on device 300. Device 300 may receive inputs from the user via input interface 310 and transmit those inputs to the remote server for processing and generating the corresponding displays. For example, device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to device 300 for presentation to the user.

In some embodiments, the encoding application may be downloaded and interpreted or otherwise run by an interpreter or virtual machine (run by control circuitry 304). In some embodiments, the encoding application may be encoded in the ETV Binary Interchange Format (EBIF), received by control circuitry 304 as part of a suitable feed, and interpreted by a user agent running on control circuitry 304. For example, the encoding application may be an EBIF application. In some embodiments, the encoding application may be defined by a series of JAVA-based files that are received and run by a local virtual machine or other suitable middleware executed by control circuitry 304. In some of such embodiments (e.g., those employing MPEG-2 or other digital media encoding schemes), the encoding application may be, for example, encoded and transmitted in an MPEG-2 object carousel with the MPEG audio and video packets of a program.

FIG. 4 is a diagram of an illustrative system 400 for encoding/decoding visual content (e.g., video content, XR content, etc.), in accordance with some embodiments of this disclosure. User equipment 420 (e.g., computing devices 421, 422, 423, 424) may be coupled to a communication network 410. The communication network 410 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 410) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the coupled devices may be provided by one or more of these communications paths but are shown as a single path in FIG. 4 to avoid overcomplicating the drawing.

Although communications paths are not drawn between the devices 421-424, these devices may communicate directly with each other via communications paths as well as other short-range, point-to-point communications paths, such as USB cables, IEEE 1394 cables, wireless paths (e.g., Bluetooth, infrared, IEEE 802-11x, etc.), or other short-range communication via wired or wireless paths. The devices 421-424 may also communicate with each other directly through an indirect path via communication network 410.

System 400 may comprise media content source 402, one or more servers 430, and one or more edge servers or edge computing devices 440 (e.g., included as part of an edge computing system). In some embodiments, the encoding application may be executed at one or more of control circuitry 431 of server 430, control circuitry of the devices 421-424, and/or control circuitry 441 of the edge server 440). In some embodiments, data may be stored at database 434 maintained at or otherwise associated with server 430, at storage 443, and/or at storage of one or more of the devices 421-424.

In some embodiments, the server 430 may include control circuitry 431 and storage 433 (e.g., RAM, ROM, Hard Disk, Removable Disk, etc.). Storage 433 may store one or more databases. Server 430 may also include an input/output path 432. I/O path 432 may provide encoding/decoding data, device information, or other data, over a local area network (LAN) or wide area network (WAN), and/or other content and data to control circuitry 431, which may include processing circuitry, and storage 433. Control circuitry 431 may be used to send and receive commands, requests, and other suitable data using I/O path 432, which may comprise I/O circuitry. I/O path 432 may connect control circuitry 431 to one or more communications paths.

Control circuitry 431 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 431 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 431 executes instructions for an emulation system application stored in memory (e.g., the storage 433). Memory may be an electronic storage device provided as storage 433 that is part of control circuitry 431.

Edge server 440 may comprise control circuitry 441, I/O path 442 and storage 443, which may be implemented in a similar manner as control circuitry 431, I/O path 432 and storage 433, respectively of server 430. Edge computing device 440 may be configured to be in communication with one or more of the computing devices 421-424 and server 430 over communication network 410, and may be configured to perform processing tasks (e.g., encoding/decoding) in connection with ongoing processing of video data. In some embodiments, a plurality of edge servers and/or edge computing devices 440 may be strategically located at various geographic locations, and may include mobile edge computing devices configured to provide processing support for mobile devices at various geographical regions.

In some embodiments, the encoding application may be a client/server application where only the client application resides on device 300, and a server application resides on an external server (e.g., server 430 and/or server 440). For example, the encoding application may be implemented partially as a client application on control circuitry 304 of device 300 and partially on server 430 as a server application running on control circuitry 431. Server 430 may be a part of a local area network with one or more of devices 300 or may be part of a cloud computing environment accessed via the Internet. In a cloud computing environment, various types of computing services for performing searches on the Internet or informational databases, providing encoding/decoding capabilities, providing storage (e.g., for a database) or parsing data (e.g., using machine learning algorithms described above and below) are provided by a collection of network-accessible computing and storage resources (e.g., server 430 and/or edge server 440), referred to as "the cloud." Device 300 may be a cloud client that relies on the cloud computing capabilities from server 430 to determine whether processing (e.g., at least a portion of virtual background processing and/or at least a portion of other processing tasks) should be offloaded from a mobile device and facilitate such offloading. When executed by control circuitry of server 430 or 440, the encoding application may instruct control circuitry 431 or 441 to perform processing tasks for a client device and facilitate the encoding/decoding.

Figure 5:
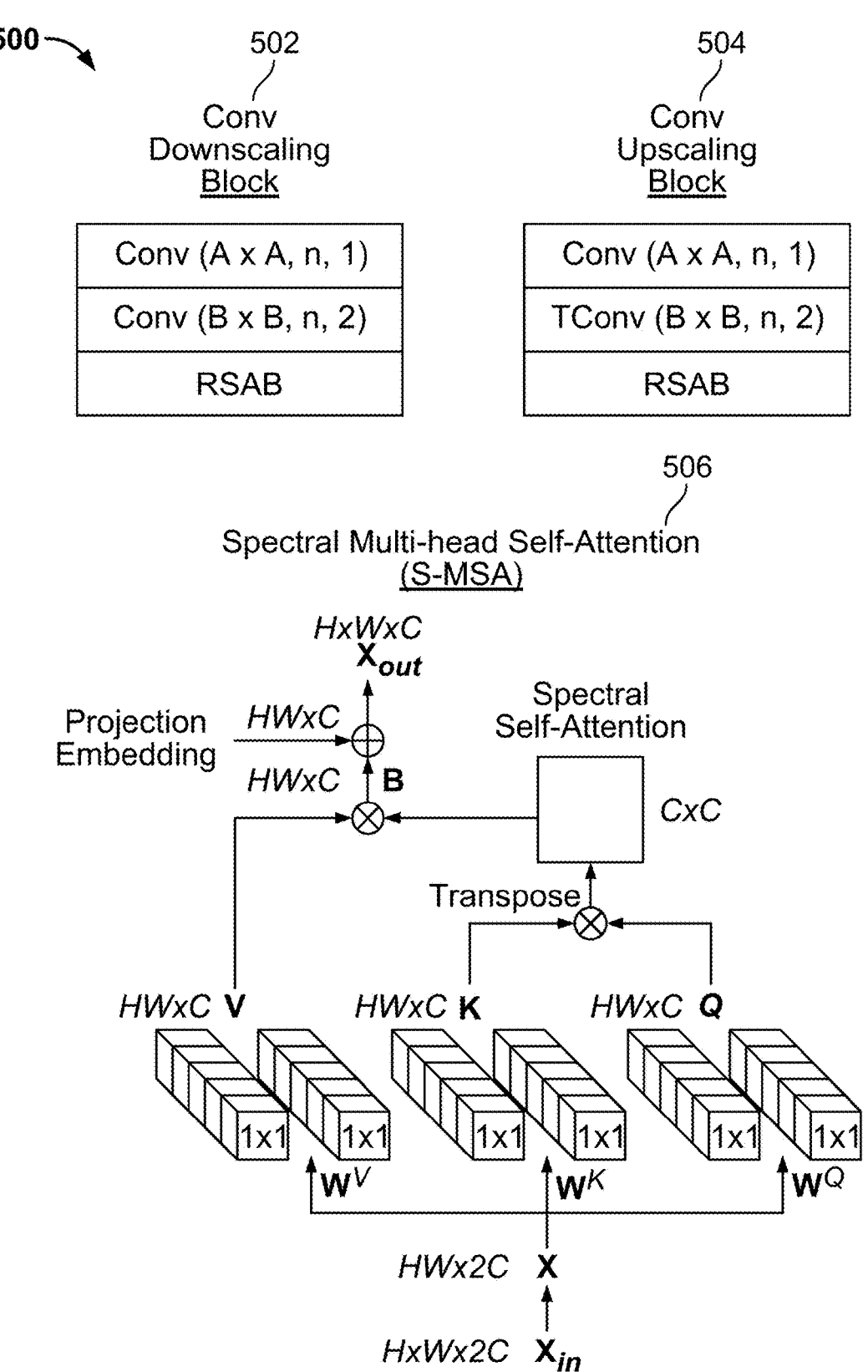
FIG. 5 shows illustrative examples of attention blocks, in accordance with some embodiments of this disclosure.

FIG. 5 shows illustrative examples 500 of attention blocks 502, 504, 506, in accordance with some embodiments of this disclosure. Block 502 is a downscaling block comprising a plurality of Conv and at least one RSAB. Block 504 is an upscaling block comprising one or more alternating Conv and TConv with at least one RSAB. As described herein, the RSAB computes a spatial attention map of the same dimensions as an input feature map, emphasizing features of the input data. For example, for a frame of dimensions 64×64, the RSAB outputs a spatial attention map having dimensions of 64×64. In some aspects, the convolutional layer(s) and the RSAB ensure that the signal of the input features is maintained during scaling operations (e.g., downscaling and upscaling).

Block 506 is an example multi-head self-attention (MSA) block as part of a channel wise transformer. In this example, block 506 is configured for spectral features and labeled Spectral-wise MSA (S-MSA). At the block 506, a data structure $X_{in}$ is inputted to a multi-head self-attention block. For illustrative purposes, $X_{in}$ may be a data structure having dimensions H×W×2C. $X_{in}$ is reorganized into data structure X having dimensions HW×2C. $X_{in}$ may be tokenized to compute X. Projections V, K, Q are computed based on X, for example, by projecting X using respective learnable weights $W^V$, $W^K$, $W^Q$. A spectral self-attention map of dimensions C×C is determined based on projections K and Q, for example, by computing $K^T Q$. In some embodiments, $K^T Q$ may be weighted by a learnable parameter σ. A self-attention head may be computed as $A=V^T(K^T Q)$. It is noted that V, K, Q may be split into N heads (e.g., $Q=[Q_1, \ldots, Q_j, \ldots, Q_N]$). The learnable parameters and heads $A_j$ may be computed concurrently, for example, through parallel processes. The output feature map $X_{out}$ is computed as the concatenation of all heads $A_j$ projected by B and added to an embedding of V (e.g., via an embedding convolution model), where B are the learnable weights of a single-layer perceptron. $X_{out}$ may be reorganized to have dimensions H×W×C. In this manner, a decoder, via the multi-head self-attention block, concurrently computes a plurality of attention maps. The attention maps are concatenated to an output feature map, which is transformed to the target output dimensions. It is noted that this example is intended to be illustrative and non-limiting. Other variants of multi-head self-attention modules (e.g., spatial, window, etc.) may be substituted without departing from the teachings of the present disclosure, for example, as described in B. Kathariya, Z. Li and G. Van der Auwera, "Joint Pixel and Frequency Feature Learning and Fusion via Channel-wise Transformer for High-Efficiency Learned In-Loop Filter in VVC," in IEEE Transactions on Circuits and Systems for Video Technology, doi: 10.1109/TCSVT.2023.3323483, which is hereby incorporated by reference herein in its entirety.

Figure 6:
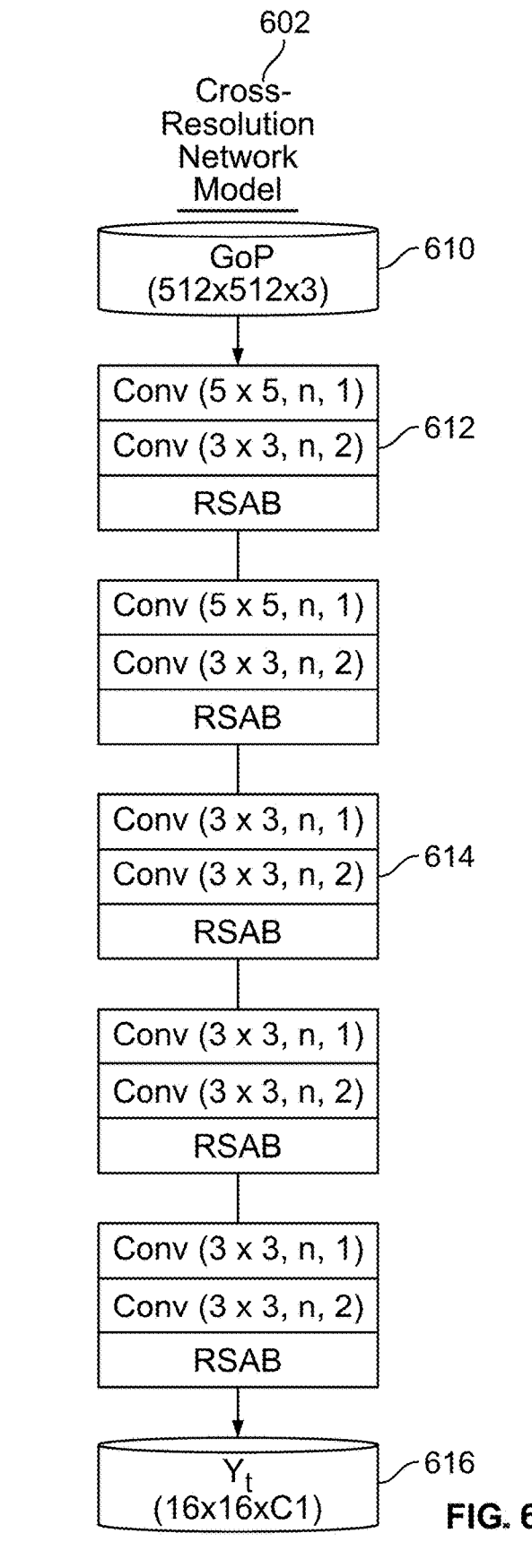
FIG. 6 shows some illustrative examples of autoencoder models configured for encoding, in accordance with some embodiments of this disclosure.

FIG. 6 shows some illustrative examples 600 of autoencoder models 601, 602 configured for encoding, in accordance with some embodiments of this disclosure. For example, the autoencoder models 601, 602 may respectively correspond with the autoencoder model 108 and the cross-resolution network model 116. The autoencoder models 601, 602 comprise one or more attention blocks for downscaling (e.g., block 502). It is appreciated that the following examples are intended to be non-limiting. It is contemplated that the autoencoder models 601, 602 may comprise any number of attention blocks or other suitable variants and suitably arranged for downscaling an input frame or GoP depending on the input and the target dimensions.

The autoencoder model 601 is configured for downscaling an input frame 604 (e.g., anchor frame 106). As an illustrative example, the input frame 604 has dimensions 64×64×3 for height, width, and pixel attributes (e.g., RGB values). The autoencoder model 601 comprises three attention blocks analogous to block 502. For example, block 606 comprises two Conv having parameters as shown (e.g., a 3×3 kernel) and an RSAB. Each attention block downscales the dimensions (e.g., 32×32, 16×16, etc.) and expands the feature channels until output features 608 (labeled $X_0$) having dimensions 8×8×C0, where C0 are the number of expanded feature channels. In this example, C0 may be 32 channels.

Autoencoder model 602 is configured for downscaling an input GoP 610 (e.g., GoP 104). As an illustrative example, the input GoP 610 may have dimensions of 512×512×3. The autoencoder model 602 comprises five attention blocks analogous to block 502. The attention blocks may have layers with different kernels. For example, the blocks 612, 614 may have the layers as shown (e.g., a 5×5 kernel for block 612, a 3×3 kernel for block 614). Each attention block downscales the dimensions (e.g., 256×256, 128×128, etc.) and expands the feature channels until output features 616

(labeled $Y_t$) having dimensions $16\times16\times C1$, where C1 are the number of expanded feature channels. In some embodiments, C0 and C1 are set to be the same or may be different. If C0 and C1 are different, additional layers may be included when decoding the features, for example, to upscale $X_0$ to have the same dimensions of $Y_t$.

Figure 7:
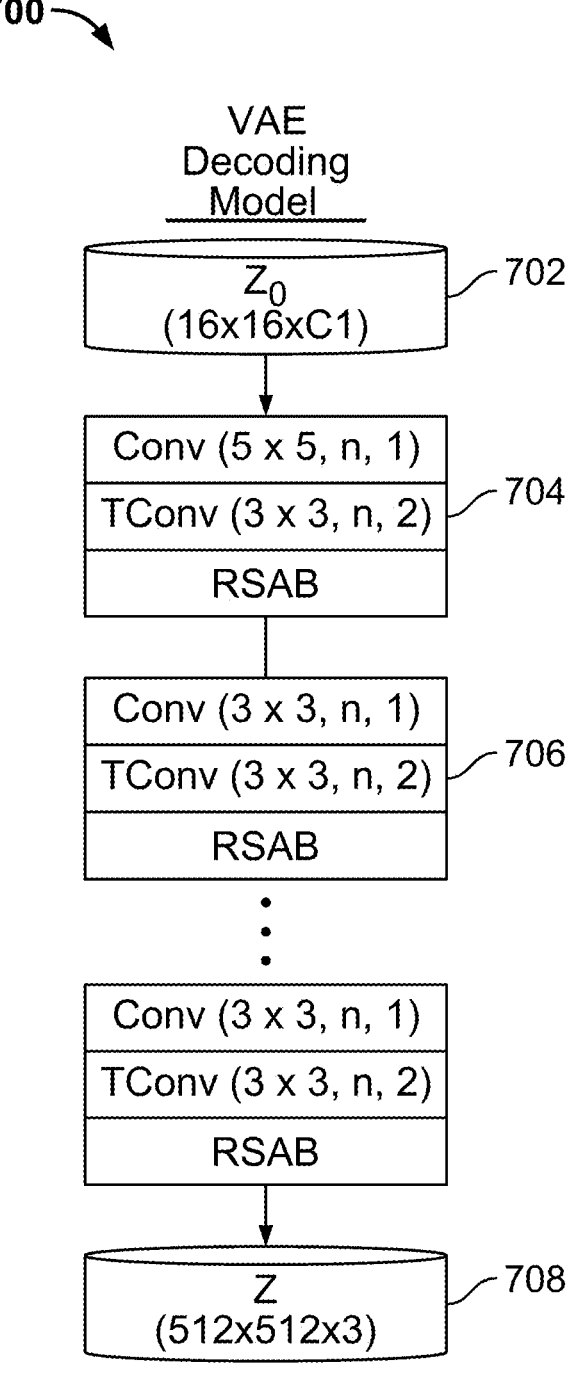
FIG. 7 shows an illustrative example of an autoencoder model configured for decoding, in accordance with some embodiments of this disclosure.

FIG. 7 shows an illustrative example of an autoencoder model 700 configured for decoding, in accordance with some embodiments of this disclosure. The autoencoder model 700 may correspond with the autoencoder model 212. The autoencoder model 700 comprises one or more attention blocks for upscaling (e.g., block 504). It is noted that the blocks of the autoencoder model 700 may be suitably arranged, replaced, added, removed, etc., depending on the input and the target dimensions.

The autoencoder model is configured for upscaling expanded features 702 (labeled $Z_0$). For example, the features 702 may correspond with the combined representation 210 determined via the cross-resolution transformer 208. As described in a previous paragraph, expanded features 702 may have the same dimensions as the latent features $Y'_t$ (e.g., $16\times16\times C1$). The attention blocks are arranged to upscale the expanded features 702 to target dimensions (e.g., same as the GoP 104). For example, blocks 704, 706 include a Conv and a TConv with parameters as shown. After block 704, a plurality of attention blocks configured like block 706 may follow. As an illustrative example, autoencoder model 700 may receive $Z_0$ having dimensions $16\times16\times C1$ with target output dimensions $512\times512\times3$. In this example, the autoencoder model 700 comprises five attention blocks, the first being block 704, and four of block 706. Each block progressively upscales the features (e.g., $32\times32$, $64\times64$, etc.) and contracts the feature channels C1 until the output features 708 (labeled Z).

Figure 8:
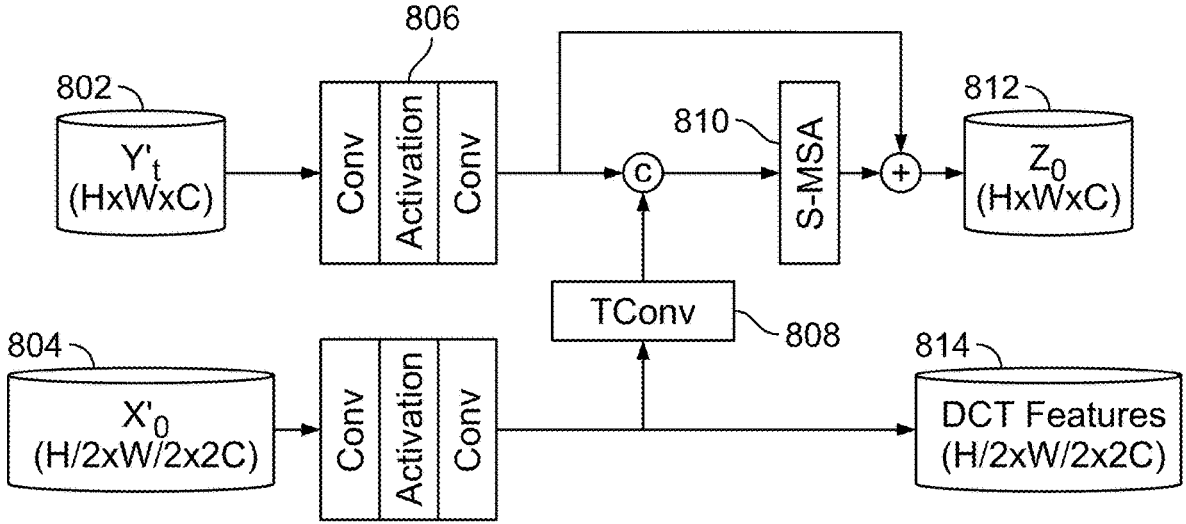
FIG. 8 shows an illustrative example of a cross-resolution transformer model, in accordance with some embodiments of this disclosure.

FIG. 8 shows an illustrative example of a cross-resolution transformer model 800, in accordance with some embodiments of this disclosure. The model 800 is configured to fuse different feature channels (e.g., spatial, spectral, temporal, etc.). The model 800 may correspond with the cross-resolution transformer model 208. The model 800 receives features 802, 804 having respective dimensions. The model 800 comprises two convolutional blocks (e.g., block 806) and an S-MSA module 810. The block 806 may be configured for extracting residual features from the input. The S-MSA module may be configured analogous to the block 506 (or another MSA variant) for combining the features 802, 804 (e.g., spatial and temporal). The model 800 may comprise a convolutional block 808 for adjusting the dimensions of the features 804.

In some aspects, the features 804 may be analogous to low-frequency components of a signal (e.g., image, video) determined from block-based signal decomposition (e.g., discrete cosine transform, orthogonal transform). For example, the low-frequency components may be akin to the spatial components of a static image. The features 802 may be analogous to mid-to-high frequency components of the signal determined from block-based signal decomposition. Accordingly, combining the features 802, 804 via the transformer model 800 may be analogous to fusing the spatial and frequency components of the signal.

As an illustrative example, the features 802 have dimensions $H\times W\times C$, and the features 804 have dimensions $H/2\times W/2\times 2C$. The residuals from the features 802, 804 (residuals 802, 804 henceforth) are determined using, for example, the block 806. Block 806 comprises two Conv with an activation function therebetween. In this example, the activation function may be a rectified linear unit (ReLU). It is noted that other activation functions may be applicable (e.g., a Gaussian error linear unit (GELU), a sigmoid function, a Heaviside function, etc.), and this example is intended to be illustrative and non-limiting. The residual 804 is upscaled using the block 808. In this example, the dimensions of the residual 804 meet the dimensions of the residual 802 after upscaling by a factor of two. Accordingly, the block 808 comprises one TConv. It is appreciated that block 808 may comprise any number of convolutional or transposed convolutional layers suitably arranged for scaling the features 804. The residuals 802, 804 are concatenated and input to the S-MSA module 810. The S-MSA module 810 combines the residuals as described with respect to the block 506. The combined residual feature is added to the residual 802 and outputted as combined features 812 (labeled $Z_0$) having dimensions $H\times W\times C$, which corresponds to the dimensions of features 802. The combined features 812 may correspond with the combined representation 210. In some embodiments, the residual features 804 are determined as features 814, which may be analogous to the decomposed frequency components of a signal (e.g., via discrete cosine transform). In this manner, spatial and temporal features may be combined for processing via an STNR model. The combined features 812 may be upscaled before being inputted to the STNR model.

Figure 9:
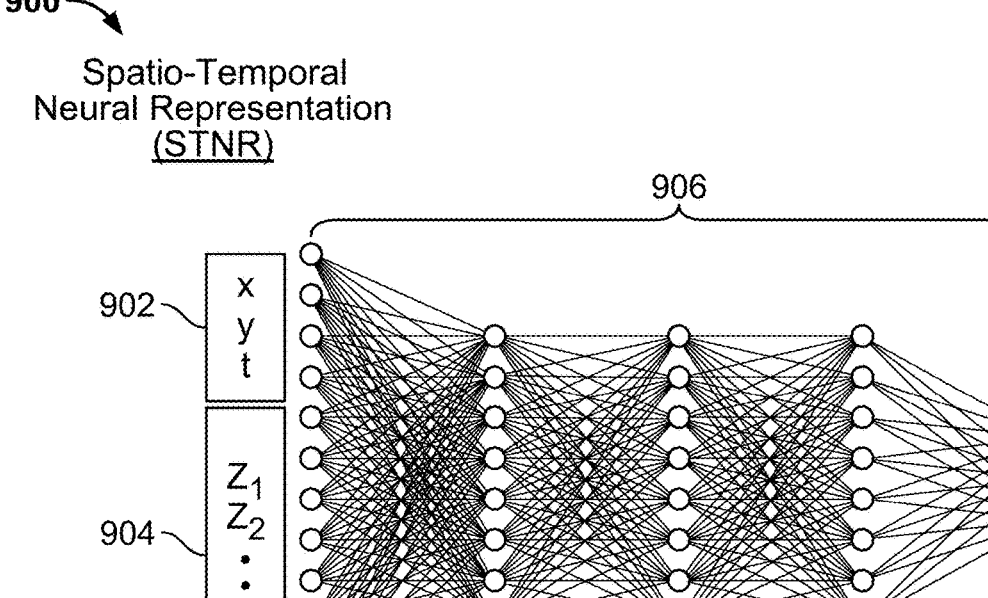
FIG. 9 shows an illustrative example of an STNR model comprising an MLP network, in accordance with some embodiments of this disclosure.

FIG. 9 shows an illustrative example of an STNR model 900 comprising an MLP network 906, in accordance with some embodiments of this disclosure. The STNR model 900 may correspond with the STNR model 216. The STNR model 900 is trained to determine pixel attribute values based on pixel coordinates 902 (labeled x, y, t) and a combined feature map 904 (labeled Z) having C channels. For example, the combined feature map 904 may correspond with the latent features 214. As an example, the MLP network 906 may comprise five network layers (e.g., an input layer, three hidden layers, and an output layer) as shown in FIG. 9. It is contemplated that an MLP network of the STNR model 900 may comprise any number of hidden layers having any number of nodes beyond what is shown.

The MLP network 906 may have been adapted for determining the pixel attribute values 908 by inputting predetermined network weights (e.g., network weights 218). In the example shown at FIG. 9, the MLP network 906 may be trained to output RGB values for an input pixel coordinate (or index in some instances). For example, the STNR model 900 may receive neural radiance network weights as described with respect to FIG. 2. The bias of the first network layer of the MLP network 906 may have been adjusted based on the neural radiance network weights to pre-train the MLP network 906.

In some aspects, the temporal correlation of pixels in a GoP is explored through the MLP network 906. As an illustrative example, the input to the MLP network 906 may be organized in two parts, the latent features Z from a convolutional network part (e.g., autoencoder model 212) and spatio-temporal coordinates representing each pixel. In one example, the latent features Z may be real-valued from a high dimensional space (e.g., 128 dimensions). The spatio-temporal coordinates for each pixel may be pre-determined from pixel information about a GoP, for example, by indicating the frame size(s) and a time (e.g., time or frame index, frame number, frame ID, play duration, etc.). For each pixel at position (x,y) and a time t, the MLP network 906 may determine and output the pixel attribute values 908 based on a corresponding latent feature from Z. For example, the MLP network 906 may output the RGB values as a function of input pixel coordinates. By determining the pixel attribute values for each pixel of a GoP, the STNR model 900 reconstructs each frame of the GoP.

In some embodiments, a configuration of the MLP network 906 may be selected depending on a target reconstruction quality. For example, the network size may be selected from a set of configurations for the network layers, indicating the number of layers and number of nodes per layer (e.g., 8×8, 12×8 and 16×8). For example, the network configuration may be selected at the encoding stage (e.g., via the framework 100) from a plurality of pre-determined network configurations and coded as part of the bitstream 124. The MLP network 906 (e.g., via the framework 200) may be adjusted accordingly. The selected network configuration may enable modifying the reconstruction quality (e.g., the pixel quality, PSNR) based on input from a client device (e.g., for adaptive streaming applications). It is noted that the autoencoder model 212 would be adjusted accordingly to upscale the latent features 214 based on the target reconstruction quality.

FIG. 10 is a flowchart of a detailed illustrative process 1000 for coding visual content, in accordance with some embodiments of this disclosure. In various embodiments, the individual steps of the process 1000 may be implemented by one or more components of the devices and/or systems of FIGS. 1-4. Although the present disclosure describes one or more steps of the process 1000 (or other processes described herein) as being implemented by components of the aforementioned devices and/or systems, it is understood that this is for illustrative purposes and is intended to be non-limiting. For example, one or more steps of the process 1000 may be implemented at an encoding device and/or suitable circuitry (e.g., control circuitry 431, 441, communications circuitry, I/O circuitry 302, display circuitry, etc.).

At block 1002, the control circuitry accesses video data comprising a sequence of frames. At block 1004, the control circuitry generates a first frame based on averaging the sequence of frames. In some embodiments, the control circuitry downscales the first frame. At block 1006, the control circuitry, via an autoencoder model, determines a sequence level representation based on the first frame (e.g., representation 110). At block 1008, the control circuitry trains a neural network model based on the sequence of frames by generating a plurality of network weights 1014 for reconstructing the sequence of frames. The network weights 1014 may include neural radiance network weights, for example, for adapting an MLP-type network. At block 1010, the control circuitry determines a cross-resolution representation corresponding to the sequence of frames (e.g., representation 118). At block 1012, the control circuitry may generate and transmit bitstreams of network weights 1014, the sequence level representation, and the cross-resolution representation, for example, to a decoding device.

As an illustrative example, a content server may deliver video content through one or more content streams. The content server may access a GoP of the video content corresponding to a first video segment to be transmitted. The content server generates an index frame by averaging pixel attributes of the GoP. The content server determines the features $X_0$ and $Y_t$ via their respective modules (e.g., models 108, 116). The content server trains a neural network model (e.g., a neural radiance field MLP network) and generates the network weights. The content server may generate and transmit bitstreams of the network weights and the features $X_0$, $Y_t$ as part of the one or more content streams to a decoding device (e.g., an edge node, a client device).

FIG. 11 is a flowchart of a detailed illustrative process for reconstructing visual content, in accordance with some embodiments of this disclosure. In various embodiments, the individual steps of the process 1100 may be implemented by one or more components of the devices and/or systems of FIGS. 1-4. Although the present disclosure describes one or more steps of the process 1100 (or other processes described herein) as being implemented by components of the aforementioned devices and/or systems, it is understood that this is for illustrative purposes and is intended to be non-limiting. For example, one or more steps of the process 1100 may be implemented at a decoding device and/or suitable circuitry (e.g., control circuitry 431, 441, communications circuitry, I/O circuitry 302, display circuitry, etc.).

At block 1102, the control circuitry receives bitstreams of network weights 1104, a sequence level representation, and a cross-resolution representation for reconstructing a sequence of frames. At block 1106, the control circuitry generates a combined representation (e.g., the combined representation 210) based on the sequence level representation and the cross-resolution representation via a channel transformer model (e.g., cross-resolution transformer model 208, 800). At block 1108, the control circuitry adapts a neural network model (e.g., comprising a convolutional part and a neural radiance MLP network part) based on the network weights 1104. At block 1110, the control circuitry, using the adapted neural network model, reconstructs the sequence of frames based on the combined representation. At block 1112, the control circuitry may generate for display the reconstructed sequence of frames.

As an illustrative example, an edge device may reconstruct video content for display using the network weights and representations received from a CDN. The edge device generates the combined features $Z_0$ from the features $X_0$, $Y_t$ using a transformer module (e.g., model 208, 800) as described with respect to FIG. 8. The combined features $Z_0$ may be upscaled using the decoding function of an autoencoder model to have target dimensions (e.g., matching GoP 104). The edge device may adapt a neural radiance MLP network model by adjusting the bias of a first network layer based on the network weights 1104. The edge device determines the pixel attribute information (e.g., RGB values) using the adapted neural radiance MLP network model and the combined features $Z_0$. The edge device reconstructs each frame of a sequence of frames based on the pixel attribute information, for example, by adjusting the color value of each pixel, or a plurality of pixels, to match the corresponding pixel attribute information. In some embodiments, the edge device may generate the reconstructed sequence for display at a user device.

The processes discussed above are intended to be illustrative and not limiting. One skilled in the art would appreciate that the steps of the processes discussed herein may be omitted, modified, combined and/or rearranged, and any additional steps may be performed without departing from the scope of the present disclosure. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

21

22

What is claimed is:

1. A method comprising:

receiving, at a client device, bitstreams of a plurality of model parameters, a sequence level representation, and a cross-resolution representation for reconstructing a sequence of frames, wherein the plurality of model parameters comprises neural radiance network parameters;

decoding the bitstreams of the plurality of model parameters, the sequence level representation, and the cross-resolution representation;

generating, via a channel transformer, a combined representation based on the sequence level representation and the cross-resolution representation;

adapting a neural network model based on the neural radiance network parameters;

reconstructing the sequence of frames by determining, via the adapted neural network model based on the combined representation, pixel attribute information for each frame of the reconstructed sequence of frames; and generating, for display at the client device, the reconstructed sequence of frames, wherein the cross-resolution representation comprises latent features corresponding to each frame of the sequence of frames.

2. The method of claim 1, wherein the adapted neural network model is trained to output pixel attribute information based on a plurality of pixel coordinates.

3. The method of claim 2, wherein the plurality of pixel coordinates comprises a timeline corresponding to the sequence of frames.

4. The method of claim 1, wherein determining, via the adapted neural network model, pixel attribute information for each frame of the reconstructed sequence of frames comprises determining a plurality of color values corresponding to a pixel of each frame based on respective spatio-temporal coordinates of the pixel.

5. The method of claim 1, wherein adapting the neural network model based on the plurality of neural radiance network parameters comprises selecting a network configuration from a plurality of pre-determined network configurations.

6. The method of claim 5, wherein the network configuration is selected based on a target reconstruction quality for the reconstructed sequence of frames.

7. The method of claim 1, wherein the client device is an extended reality (XR) device, and wherein the sequence of frames collectively defines a field of view (FoV) at the XR device.

8. The method of claim 7, wherein the sequence of frames corresponds to one or more display refresh cycles at the XR device.

9. A system comprising:

communications circuitry configured to receive, at a client device, bitstreams of a plurality of model parameters, a sequence level representation, and a cross-resolution representation for reconstructing a sequence of frames, wherein the plurality of model parameters comprises neural radiance network parameters; and control circuitry configured to:

decode the bitstreams of the plurality of model parameters, the sequence level representation, and the cross-resolution representation;

generate, via a channel transformer, a combined representation based on the sequence level representation and the cross-resolution representation;

adapt a neural network model based on the neural radiance network parameters;

reconstruct the sequence of frames by determining, via the adapted neural network model based on the combined representation, pixel attribute information for each frame of the reconstructed sequence of frames; and generate, for display at the client device, the reconstructed sequence of frames, wherein the cross-resolution representation comprises latent features corresponding to each frame of the sequence of frames.

10. The system of claim 9, wherein the sequence of frames corresponds to a first resolution, and wherein the control circuitry is further configured to use a convolutional network model comprising a plurality of residual spatial attention blocks to generate the combined representation at the first resolution.

11. The system of claim 10, wherein the control circuitry is configured to output, using the adapted neural network model, pixel attribute information based on a plurality of pixel coordinates.

12. The system of claim 11, wherein the plurality of pixel coordinates comprises a timeline corresponding to the sequence of frames.

13. The system of claim 9, wherein the control circuitry is further configured to determine a plurality of color values corresponding to a pixel of each frame based on respective spatio-temporal coordinates of the pixel.

14. The system of claim 13, wherein the control circuitry is further configured to select a network configuration from a plurality of pre-determined network configurations.

15. The system of claim 14, wherein the control circuitry is configured to select the network configuration based on a target reconstruction quality for the reconstructed sequence of frames.

16. The system of claim 9, wherein the client device is an extended reality (XR) device, and the sequence of frames collectively defines a field of view (FoV) at the XR device.

17. The system of claim 16, wherein the sequence of frames corresponds to one or more display refresh cycles at the XR device.

18. A method comprising:

receiving, at a client device, bitstreams of a plurality of model parameters, a sequence level representation, and a cross-resolution representation for reconstructing a sequence of frames, wherein the plurality of model parameters comprises neural radiance network parameters;

decoding the bitstreams of the plurality of model parameters, the sequence level representation, and the cross-resolution representation;

generating, via a channel transformer, a combined representation based on the sequence level representation and the cross-resolution representation;

adapting a neural network model based on the neural radiance network parameters;

reconstructing the sequence of frames by determining, via the adapted neural network model based on the combined representation, pixel attribute information for each frame of the reconstructed sequence of frames; and generating, for display at the client device, the reconstructed sequence of frames, wherein the sequence of frames corresponds to a first resolution, the method further comprising using a convolutional network model comprising a plurality of residual spatial attention blocks to generate the combined representation at the first resolution.

19. The method of claim 18, wherein the cross-resolution representation comprises latent features corresponding to each frame of the sequence of frames.

20. The method of claim 18, wherein the adapted neural network model is trained to output pixel attribute information based on a plurality of pixel coordinates.

* * * * *